United States Patent
Tanaka (10) Patent No.: US 6,326,959 B1
(45) Date of Patent: Dec. 4, 2001

(54) DISPLAY PANEL DRIVER

(75) Inventor: Toshimasa Tanaka, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 09/083,120

(22) Filed: May 22, 1998

(30) Foreign Application Priority Data

May 22, 1997 (JP) .................................................. 9-132355

(51) Int. Cl.[7] .............................. G09G 5/00; G09G 3/36
(52) U.S. Cl. ................................ 345/211; 345/90; 345/98
(58) Field of Search .................................. 345/96, 98, 90, 345/211

(56) References Cited

U.S. PATENT DOCUMENTS

| | | | | |
|---|---|---|---|---|
| 4,123,671 | * | 10/1978 | Aihara et al. ........................ | 307/270 |
| 5,198,747 | * | 3/1993 | Height ................................... | 307/310 |
| 5,317,332 | * | 5/1994 | Kanno et al. ........................... | 345/94 |

* cited by examiner

Primary Examiner—Regina Liang
Assistant Examiner—Duc Q Dinh
(74) Attorney, Agent, or Firm—Arent Fox Kintner Plotkin & Kahn PLLC

(57) ABSTRACT

A display panel driver has a battery, a controller for monitoring the power source voltage supplied from the battery and outputting a control signal in accordance with the power source voltage, a voltage step-up circuit for stepping up the power source voltage supplied from the battery by a factor specified by the control signal, and a display panel driver circuit for producing signals for driving a display panel from the voltage outputted from the voltage step-up circuit. The voltage step-up circuit includes an input terminal for receiving the power source voltage, an output terminal for outputting a stepped-up voltage, a plurality of switching devices connected in series between the input terminal and the output terminal, a plurality of capacitors each connected, at one end, to the output electrode of one of the switching devices, a first circuit, connected to the other end of each of the capacitors, for setting the other end of two adjacent ones of the capacitors at two different binary levels in accordance with the control signal, and a second circuit for turning on and off the switching devices in accordance with the control signal.

11 Claims, 5 Drawing Sheets

DISPLAY PANEL DRIVER

BACKGROUND OF THE INVENTION

1. Field of the Invention

The present invention relates to a display panel driver for driving a liquid crystal display panel or the like, and particularly to a display panel driver having a voltage step-up circuit

2. Description of the Prior Art

A display panel such as a liquid crystal display device is driven by a driver IC (integrated circuit) to achieve display. Such a driver IC is supplied with a power source voltage by a battery, and is controlled by a microcomputer to produce driving signals.

The driver IC includes a voltage step-up circuit for stepping up the power source voltage. The produced stepped-up voltage is fed to a display voltage producing circuit.

The voltage step-up circuit steps up the power source voltage in such a way that voltages stepped-up by different factors appear at different ports for output.

This conventional display panel driver, however, has the following disadvantage. The power source voltage supplied from the battery to the driver IC varies with the type of the battery. Accordingly, within the driver IC, to allow the display voltage producing circuit to receive an appropriate voltage in any situation, the voltage step-up circuit is provided with a plurality of output ports to output a plurality of voltages stepped-up by different factors.

For example, consider a case where the battery voltage Vin is 3.3 V and this voltage needs to be stepped up by a factor of three by the voltage step-up circuit to obtain a display voltage of 8.0 V from the display voltage producing circuit. In this case, if replacing the battery, for example, ends in reducing the power source voltage to 2.0 V, then it is impossible to obtain a voltage higher than 6.0 V simply by stepping up the power source voltage by a factor of three, and thus it is impossible to achieve display on the display panel.

One way to obtain a display voltage of 8.0 V at the maximum even when the battery voltage is 2.0 V is to set the voltage step-up circuit to step up the voltage by a factor of five, feed the stepped-up voltage to the display voltage producing circuit, and adjust it to 8 V by the use of an appropriate adjusting circuit. In this case, however, if the battery voltage Vin is 3.3 V, the voltage step-up circuit steps it up by a factor of five, that is, to 16.5 V. Such excessive stepping up of the voltage leads to unduly high current consumption.

SUMMARY OF THE INVENTION

An object of the present invention is to provide a display panel driver that does not produce an excessively high stepped-up voltage and that does not require the provision of a plurality of output ports.

To achieve the above object, in one embodiment of the present invention, a display panel driver is provided with a control means for monitoring the power source voltage supplied from the power source and outputting a control signal in accordance with the power source voltage. The control signal is fed to a voltage step-up circuit. The voltage step-up circuit steps up the power source voltage supplied from the battery by a factor specified by the control signal, and outputs a stepped-up voltage. From the voltage outputted from the voltage step-up circuit, a display panel driver circuit produces signals for driving a display panel.

In this construction, it is possible to set an appropriate voltage step-up factor in accordance with the power source voltage, and thus it is possible to avoid excessive stepping-up of the voltage and thereby obtain an appropriately stepped-up voltage.

Moreover, according to the present invention, it is also possible to detect the ambient temperature around the display panel by the use of a temperature sensor so that the control circuit will output the control signal in accordance with the ambient temperature.

In this construction, even with a display panel such as a liquid crystal display panel whose response varies with the ambient temperature, the control circuit can compensate for such variation, and thus it is possible to obtain an appropriately stepped-up voltage.

BRIEF DESCRIPTION OF THE DRAWINGS

This and other objects and features of the present invention will become clear from the following description, taken in conjunction with the preferred embodiments with reference to the accompanied drawings in which.

DESCRIPTION OF THE PREFERRED EMBODIMENTS

<First Embodiment>

Figure 1:
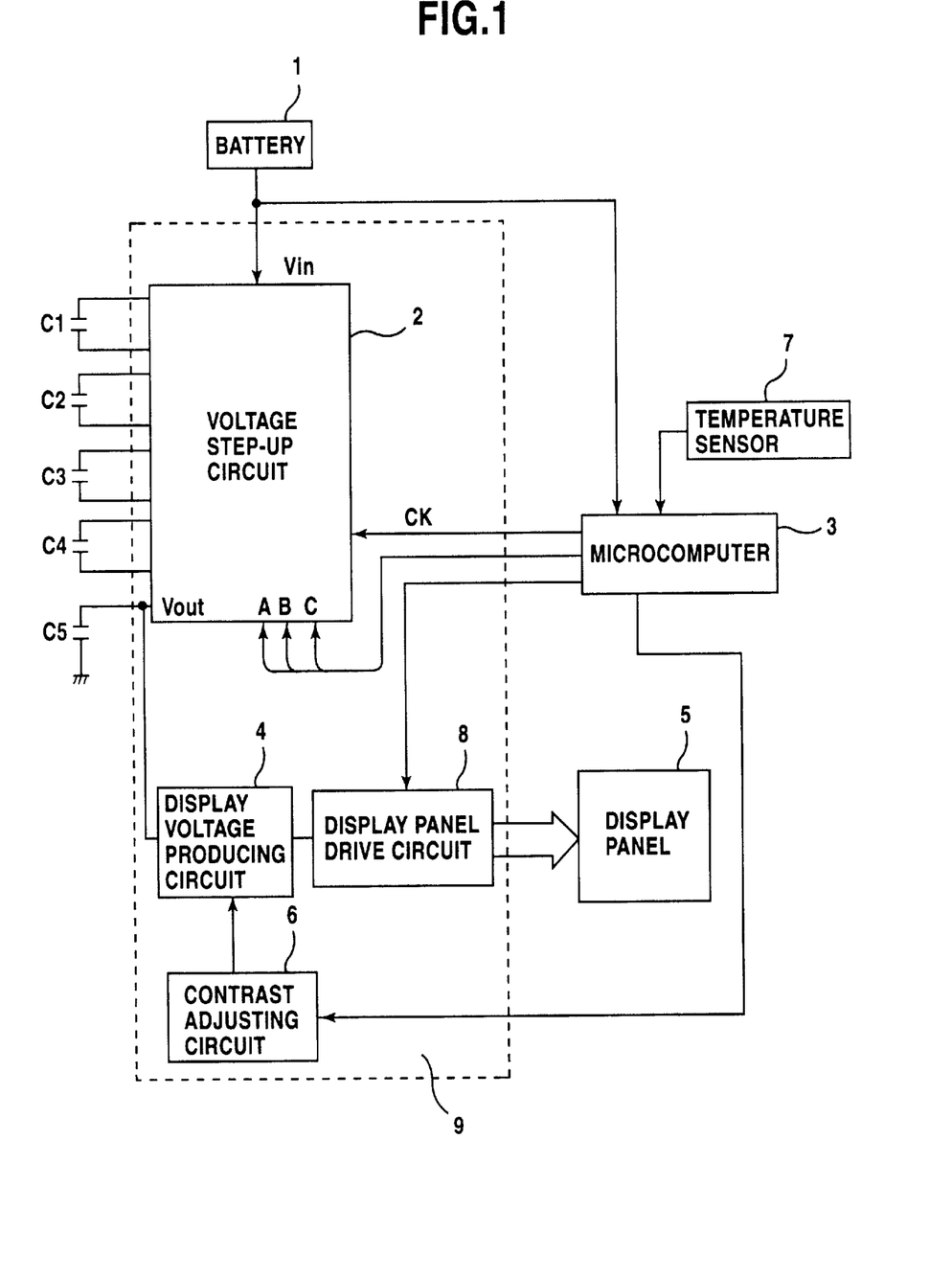
FIG. 1 is a block diagram of the display panel driver of a first embodiment of the invention.

A first embodiment of the present invention will be described below with reference to FIGS. 1 to 4. FIG. 1 is a block diagram of the display panel driver of the first embodiment. This display panel driver, for driving a display panel 5, is formed as a driver IC 9. The driver IC 9 operates on the power source voltage supplied from a battery 1, and is controlled by a microcomputer 3 to produce driving signals that are fed to the display panel 5. The microcomputer 3 monitors, on the one hand, the power source voltage Vin and, on the other hand, the ambient temperature around the display panel 5 by the use of a temperature sensor 7. The driver IC 9 includes a voltage step-up circuit 2, a display voltage producing circuit 4, a contrast adjusting circuit 6, and a display panel driver circuit 8.

The voltage step-up circuit 2 varies the voltage step-up factor in accordance with control signals that it receives at its input ports A, B, and C from the microcomputer 3 serving as a control circuit. The voltage step-up circuit 2 outputs a voltage Vout at its only output port. In addition, the microcomputer 3 feeds the voltage step-up circuit 2 with a clock CK. The voltage Vout outputted from the voltage step-up circuit 2 is supplied to the display voltage producing circuit 4 as the maximum display voltage to be supplied to the display panel 5. The display voltage producing circuit 4, with the help of the contrast adjusting circuit 6, adjusts the voltage to produce a display voltage as will be described later.

By the use of this display voltage, the display panel driver circuit 8 produces driving signals in accordance with the display data fed from the microcomputer 3. These driving signals are fed to the display panel 5 to display an image thereon. Note that the voltage step-up capacitors C1 to C5 that need to be connected to the voltage step-up circuit 2 are provided outside the driver IC 9.

Figure 2:
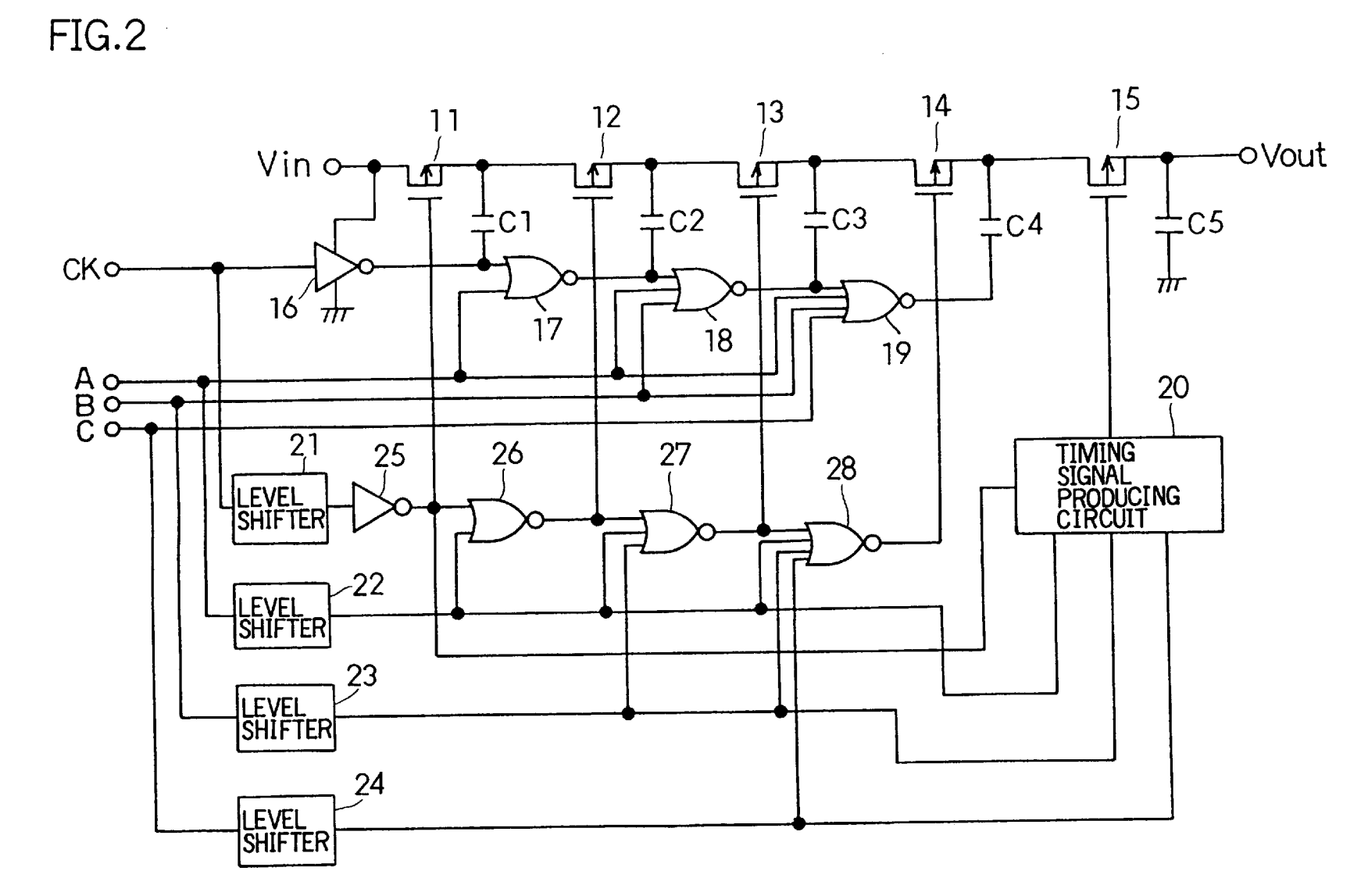
FIG. 2 is a circuit diagram of an example of the voltage step-up circuit shown in FIG. 1.

FIG. 2 is a circuit diagram of an example of the voltage step-up circuit 2. It has five p-channel MOSFETs (metal-oxide semiconductor field-effect transistors) 11 to 15 connected between an input port for receiving the power source voltage Vin from the battery 1 and an output port for outputting a stepped-up voltage Vout. In accordance with the clock CK and the signals fed to the ports A, B, and C, these MOSFETs 11 to 15 are turned on and off in the manner described below.

First, the clock CK is inverted by an inverter 16. The inverter 16 operates on the power source voltage Vin; when it outputs a high level, it outputs a voltage equal to the voltage Vin, and, when it outputs a low level, it outputs a voltage equal to the ground level. The output of the inverter 16 and the signal fed to the port A are fed to a NOR gate 17. The output terminal of the inverter 16 is connected through the voltage step-up capacitor C1 to the junction between the MOSFETs 11 and 12.

The output of the NOR gate 17 and the signals fed to the ports A and B are fed to another NOR gate 18. The output terminal of the NOR gate 17 is connected through the voltage step-up capacitor C2 to the junction between the MOSFETs 12 and 13. The output of the NOR gate 18 and the signals fed to the ports A, B, and C are fed to another NOR gate 19. The output terminal of the NOR gate 18 is connected through the voltage step-up capacitor C3 to the junction between the MOSFETs 13 and 14. The output terminal of the NOR gate 19 is connected through the voltage step-up capacitor C4 to the junction between the MOSFETs 14 and 15. The NOR gates 17 to 19, like the NOR gate 16, all operate on the voltage Vin.

The clock CK and the signals fed to the ports A, B, and C are then subjected to level conversion by level shifter 21 to 24 so that their respective levels are converted into those required in logic operations, that is, so that they are equal to a voltage VDD when they are at a high level and equal to the ground level when they are at a low level. The voltage VDD is used as the power source voltage inside the driver IC 9 (see FIG. 1), hence VDD≦Vin. The output of the level shifter 21 is inverted by an inverter 25. The output terminal of the inverter 25 is connected to the gate of the MOSFET 11. The output of the inverter 25 and the output of the level shifter 22 are fed to a NOR gate 26.

The output terminal of the NOR gate 26 is connected to the gate of the MOSFET 12. The output of the NOR gate 26 and the outputs of the level shifters 22 and 23 are fed to another NOR gate 27. The output terminal of the NOR gate 27 is connected to the gate of the MOSFET 13. The output of the NOR gate 27 and the outputs of the level shifters 22, 23, and 24 are fed to another NOR gate 28. The output terminal of the NOR gate 28 is connected to the gate of the MOSFET 14.

The gate of the MOSFET 15 is connected to a timing signal producing circuit 20, which turns on and off the MOSFET 15 in accordance with the signals it receives from the inverter 25 and the level shifters 22 to 24. The voltage step-up capacitor C5 is connected between the output port side terminal of the MOSFET 15 and the ground level. To allow the MOSFETs 11 to 15 to be turned off securely, the inverter 25, the NOR gates 26 to 28, and the timing signal producing circuit 20 operate on the voltage Vout, which is a stepped-up voltage, and thus output this voltage when they output a high level. The MOSFETs 11 to 15 are all p-channel MOS transistors that operate as switching devices.

The voltage step-up circuit 2 operates as follows. First, assume that the signals fed to the ports A, B, and C are such that A=B=C="0"(low level). Then, the inverter 16 and the NOR gates 17 to 19 are all kept active, and therefore, in synchronism with the clock CK, they all output a high level and a low level alternately at predetermined intervals. Similarly, the inverter 25 and the NOR gates 26 to 28, too, are all kept active.

In an interval in which the clock CK is at a high level, the inverter 25 outputs a low level and thus keeps the MOSFET 11 on. At this time, the inverter 16 also outputs a low level and thus causes the capacitor C1 to be charged with the voltage Vin. At this time, the NOR gate 26 outputs a high level and thus keeps the MOSFET 12 off.

Next, in an interval in which the clock CK is at a low level, the inverter 25 outputs a high level and thus keeps the MOSFET 11 off. This causes the NOR gate 26 to output a low level and thus keeps the MOSFET 12 on. On the other hand, the inverter 16 outputs a voltage equal to the voltage Vin and thus causes the capacitor C2 to be charged with a voltage 2×Vin. In this way, the voltage is stepped up. In the subsequent stages, the capacitor C3 is charged with a voltage 3×Vin, and the capacitor C4 is charged with a voltage 4×Vin.

When the NOR gate 28 outputs a high level, the timing signal producing circuit 20 applies a low-level signal to the gate of the MOSFET 15 and thereby turns it on; when the NOR gate 28 outputs a low level, the timing signal producing circuit 20 applies a high-level signal to the gate of the MOSFET 15 and thereby turns it off. This causes the capacitor C5 to be charged with a voltage 5×Vin. Thus, the output voltage Vout is obtained as a voltage 5×Vin, i.e. the voltage Vin as stepped up by a factor of five.

Next, assume that the input signals are such that A=B=C="1" (high level). Then, the NOR gates 17 to 19 constantly output a low level and thus cause the capacitors C2 to C4 to be kept grounded at one end. On the other hand, the NOR gates 26 to 28 constantly output a low level and thus keep the MOSFETs 12 to 14 on.

When the inverter 25 outputs a high level, the timing signal producing circuit 20 applies a low-level signal to the gate of the MOSFET 15; when the inverter 16 outputs a low level, the timing signal producing circuit 20 applies a high-level signal to the gate of the MOSFET 15. This causes the capacitor C1 to be charged with the voltage Vin and the capacitor C5 to be charged with a voltage 2×Vin. As a result, the voltage Vout outputted from the voltage step-up circuit 2 is obtained as a voltage 2×Vin, i.e. the voltage Vin as stepped up by a factor of two.

When the input signals are such that A=B="0" and C="1", then the inverters 16 and 25 and the NOR gates 17, 18, 26, and 27 are kept active, and the NOR gates 19 and 28 constantly output a low level. When the NOR gate 27 outputs a high level, the timing signal producing circuit 20 applies a low-level signal to the gate of the MOSFET 15; when the NOR gate 27 outputs a low level, the timing signal producing circuit 20 applies a high-level signal to the gate of the MOSFET 15. As a result, the voltage Vout outputted from the voltage step-up circuit 2 is obtained as a voltage 4×Vin, i.e. the voltage Vin as stepped up by a factor of four.

When the input signals are such that A="0" and B=C="1", then the inverters 16 and 25 and the NOR gates 17 and 26 are kept active, and the NOR gates 18, 19, 27, and 28 constantly output a low level. When the NOR gate 26 outputs a high level, the timing signal producing circuit 20 applies a low-level signal to the gate of the MOSFET 15; when the NOR gate 26 outputs a low level, the timing signal producing circuit 20 applies a high-level signal to the gate of the MOSFET 15. As a result, the voltage Vout outputted from the voltage step-up circuit 2 is obtained as a voltage 3×Vin, i.e. the voltage Vin as stepped up by a factor of three.

The results of these operations are listed in Table 1 below. Note that prohibited combinations of signals such as A=B="1" and C="0" do not occur, because, as shown in FIG. 2, the input port A is connected not only to the NOR gate 17 but also to the NOR gates 18 and 19 and the input port B is connected not only to the NOR gate 18 but also to the NOR gate 19 so that the circuit itself will prevent the occurrence of prohibited combinations of signals.

TABLE 1

| A | B | C | Voltage Step-up Factor |
|---|---|---|---|
| 0 | 0 | 0 | 5 |
| 0 | 0 | 1 | 4 |
| 0 | 1 | 0 | (Prohibited) |
| 0 | 1 | 1 | 3 |
| 1 | 0 | 0 | (Prohibited) |
| 1 | 0 | 1 | (Prohibited) |
| 1 | 1 | 0 | (Prohibited) |
| 1 | 1 | 1 | 2 |

Figure 4:
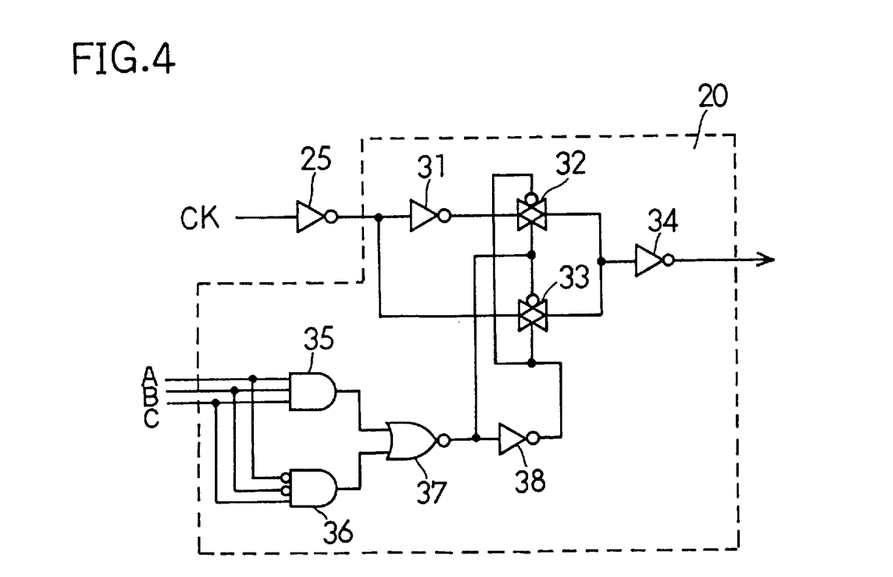
FIG. 4 is a circuit diagram of an example of the timing signal producing circuit of the voltage step-up circuit in the first embodiment.

FIG. 4 shows an example of the timing signal producing circuit 20. As described previously, the clock CK that is fed to the voltage step-up circuit 2 is first subjected to level conversion by the level shifter 21 (see FIG. 2) to have appropriate logic voltage levels, and is then inverted by the inverter 25. The output of the inverter 25 is fed to an inverter 31 provided in the timing signal producing circuit 20. Between this inverter 31 and another inverter 34 provided on the output side, an analog switch 32 is inserted. In parallel with the combination of the inverter 31 and the analog switch 32, another analog switch 33 is connected.

The signals fed to the ports A, B, and C are first subjected to level conversion by the level shifters 22, 23, and 24 (see FIG. 2), respectively, to have appropriate logic voltage levels, and are then fed to the timing signal producing circuit 20. In the timing signal producing circuit 20, these signals, which are fed from the ports A, B, and C after the level conversion, are fed to an AND gate 35. In addition, the signals fed to the ports A and B are, after inversion, fed to another AND gate 36, and the signal fed to the port C is, as it is, fed to the same AND gate 36. The outputs of the AND gates 35 and 36 are fed to a NOR gate 37.

The output of the NOR gate 37 is fed to the gate of the analog switch 32. Moreover, the output of the NOR gate 37 is also, after being inverted by an inverter 38, fed to the gate of the analog switch 33. The output of the inverter 34 is fed to the gate of the MOSEET 15 (see FIG. 2). Having such a construction, the timing signal producing circuit 20 operates as described above.

The microcomputer 3 (see FIG. 1) monitors the power source voltage Vin and operates in such a way that, as the voltage Vin drops, the voltage step-up factor is increased and, as the voltage Vin rises, the voltage step-up factor is decreased. In addition, in this embodiment, to cope with cases where the display panel 5 (see FIG. 1) is a liquid crystal display panel, consideration is given also to the variation in the response of the liquid crystal with the ambient temperature. For example, assume that the display panel 5 requires as the display voltage a voltage of 7.0 V at normal temperature, a voltage of 9.0 V at low temperature, and a voltage of 6.0 V at high temperature. Then, the microcomputer 3 feeds the control signal to the voltage step-up circuit 2 in such a way that the voltage step-up factor is set at three when the ambient temperature is normal or low and at two when the ambient temperature is high.

By contrast, when, as a result of the discharging of the battery 1 or the change of the type of the battery 1, the voltage Vin drops to 2.0 V, the voltage step-up factor is set at four at normal or high temperature and at five at low temperature. In addition, the contrast adjusting circuit 6 adjusts the contrast to obtain the required voltages noted above. The results of these operations are listed in Table 2 below.

TABLE 2

| | Voltage Step-up Factor | | |
|---|---|---|---|
| Voltage | Low Temperature | Normal Temperature | High Temperature |
| 2.0 V | 5 | 4 | 4 |
| 3.3 V | 3 | 3 | 2 |

As a result of control as described above, the voltage step-up factor is set at five only when the voltage Vin of the battery 1 is 2.0 V and the ambient temperature is low. When the voltage of the battery 1 is 3.3 V, the voltage step-up factor is set at two or three; this prevents the voltage step-up circuit 2 from outputting an excessively high stepped-up voltage and thus helps reduce the current consumption. Moreover, even with a liquid crystal display panel or the like whose response varies with the ambient temperature, the microcomputer 3 compensates for such variation by appropriately changing the voltage step-up factor of the voltage step-up circuit 2, and thus it is possible to obtain an appropriate stepped-up voltage Vout.

Figure 3:
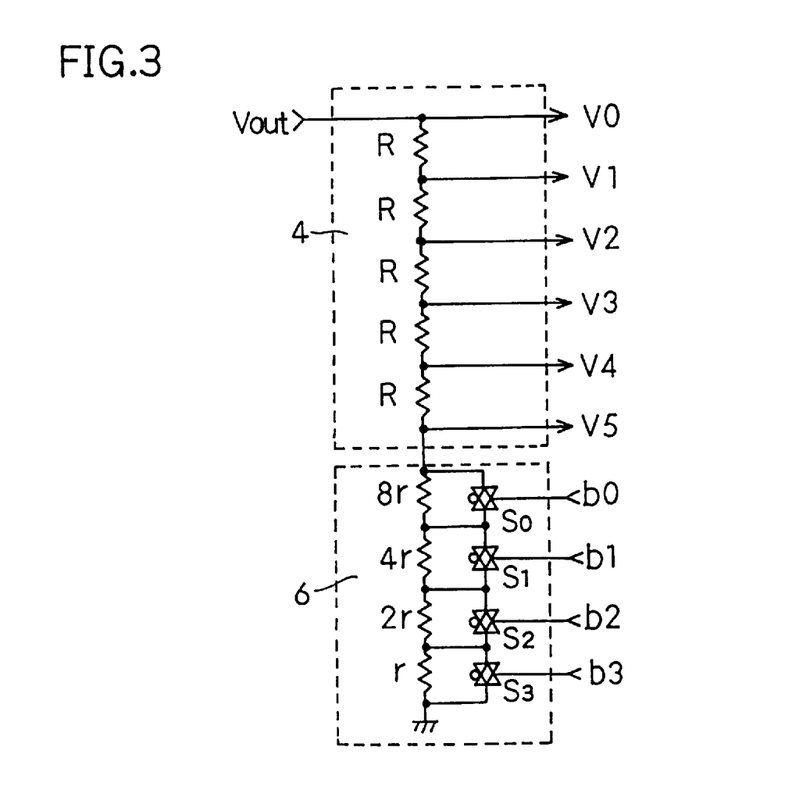
FIG. 3 is a circuit diagram of examples of the display voltage producing circuit and the contrast adjusting circuit shown in FIG. 1.

Next, a description will be given as to how the display panel 5 is driven by the use of the voltage Vout obtained by varying the voltage step-up factor. FIG. 3 is a circuit diagram of examples of the display voltage producing circuit 4 and the contrast adjusting circuit 6. The display voltage producing circuit 4 receives the voltage Vout from the voltage step-up circuit 2, and feeds it, as it is, to the display panel driver circuit 8 (see FIG. 1).

Between the voltage Vout and the ground level, a circuit is connected that consists of, from the voltage Vout side, five resistors having a resistance R and four resistors having resistances 8r, 4r, 2r, and r, respectively, with all these resistors connected in series. At the individual junctions between the five resistors R appear voltages V1 to V4. At the junction between the bottommost one of the resistors R and the resistor 8r appears a voltage V5. The portion that performs voltage division by the user of the five resistors R constitutes the display voltage producing circuit 4 (see FIG. 1).

The contrast adjusting circuit 6 has analog switches S0, S1, S2, and S3 that are connected in parallel with the resistors 8r, 4r, 2r, and r, respectively. The analog switches S0 to S3 are turned on and off by four-bit signals b0 to b3, respectively, that are fed to the contrast adjusting circuit 6. This causes the voltages V1 to V5 to vary and thereby achieves adjustment of the contrast in 16 shades. In this embodiment, the signals b0 to b3 are fed from the microcomputer 3 (see FIG. 1).

In FIG. 1, the display panel driver circuit 8 produces driving signals by the use of the voltages V0 to V5 in accordance with image data fed from the microcomputer 3, and outputs the driving signals to the display panel 5. For example, in a case where a dot-matrix type display panel 5 is driven, the display panel driver circuit 8 produces periodical driving signals to be fed to segment electrodes and common electrodes.

As described above, in this embodiment, the voltage step-up factor is varied automatically in accordance with the ambient temperature and the power source voltage Vin. As a result, the voltage step-up circuit 2 never outputs an excessively high voltage and thus it is possible to obtain an appropriate voltage Vout. This helps reduce the current consumption and eliminate the need to switch between output ports. Moreover, this embodiment also helps reduce the withstand voltage required in the driver IC 9. For example, in the conventional display panel driver described earlier, the withstand voltage of the driver IC 52 needs to be 16.5 V or higher when the voltage Vin of the battery 1 is 3.3 V and the voltage step-up circuit 50 steps up the voltage by a factor of five. By contrast, in this embodiment, appropriate control of the voltage step-up factor permits the withstand voltage of the driver IC 9 to be 10.0 V or higher. This makes it possible to shrink design rules associated with high-withstand-voltage processes, and thus leads to cost reduction.

Although the voltage step-up circuit 2 for stepping up a voltage and the display panel driver circuit 8 for producing driving signals have different functions, they are often formed on a single-chip IC like the driver IC 9 of this embodiment. It is to be understood that specific voltage step-up factors used in this embodiment are merely examples for explaining how the microcomputer 3 operates, and therefore, in actual applications, appropriate voltage step-up factors need to be determined in accordance with the display voltage required to drive the display panel 5, the power source voltage Vin of the battery 1, and other factors. Although five capacitors C1 to C5 are used in the voltage step-up circuit 2 of this embodiment to achieve voltage step-up factors between two to five, it is also possible to use a different number of voltage step-up capacitors to obtain a different range of the voltage step-up factor. Similarly, the control signals fed to the ports A, B, and C do not need to be exactly as they are in this embodiment but may be in any form as long as they can control the number of active voltage step-up capacitors.

The number of steps of the output voltage outputted from the display voltage producing circuit 4 may not be six (V0 to V5). It may be altered in accordance with the construction of the display panel driver circuit 8. Moreover, although, in the example shown in FIG. 4, the contrast adjusting circuit 6 achieves adjustment of the contrast in 16 shades by the use of four-bit input signals b0 to b3, it is also possible to use a different number of bits to achieve contrast adjustment in a different number of shades. In cases where a dot-matrix type display panel 5 is driven, it is possible to produce the clock CK by the use of an oscillation circuit that is provided in the display panel driver circuit 8 within the driver IC 9 for the synchronization of the driving signals.

<Second Embodiment>

Figure 5:
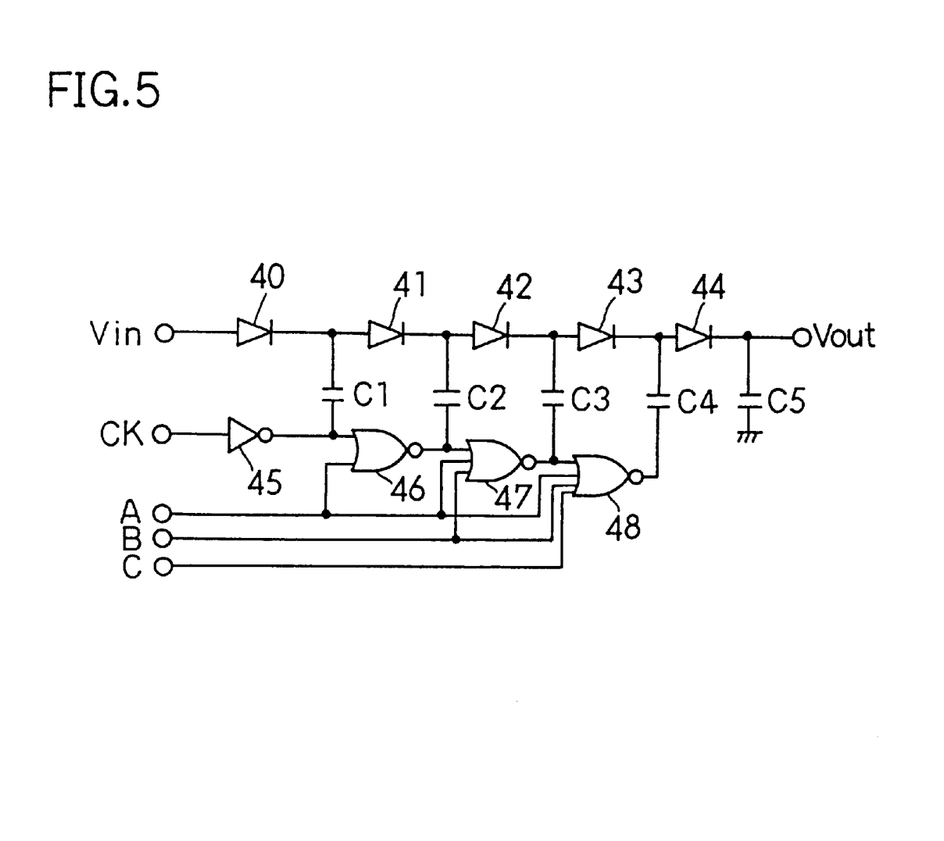
FIG. 5 is a circuit diagram of the voltage step-up circuit of the display panel driver of a second embodiment of the invention.
Figure 6:
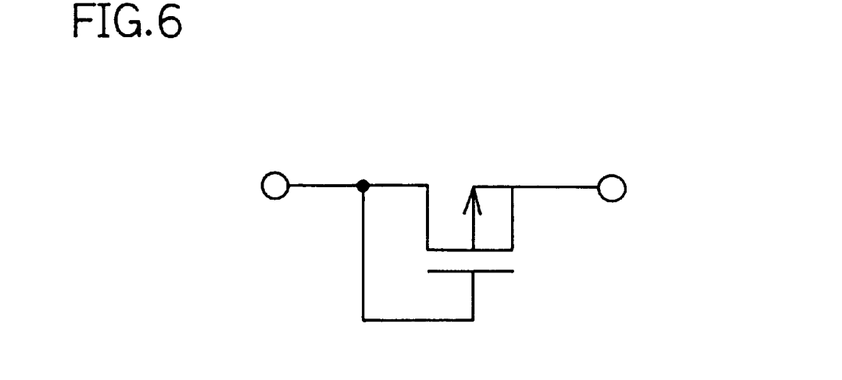
FIG. 6 is a diagram showing how a MOSFET can be used as each of the diodes used in the voltage step-up circuit shown in FIG. 5.

A second embodiment of the present invention will be described below with reference to FIGS. 5 and 6. In this embodiment, the voltage step-up circuit 2 shown in FIG. 1 has a construction as shown in FIG. 5. In other respects, this embodiment is quite the same as the previous embodiment, and therefore overlapping explanations will not be repeated.

In FIG. 5, five diodes 40 to 44 are connected between the input port for receiving the power source voltage Vin and the output port for outputting a stepped-up voltage Vout. These diodes 40 to 44 are all connected with their anode directed toward the input port for the voltage Vin. The clock CK that is fed to the voltage step-up circuit 2 is inverted by an inverter 45. The output of the inverter 45 and the signal fed to the port A are fed to a NOR circuit 46. The output terminal of the inverter 45 is connected through the voltage step-up capacitor C1 to the junction between the diodes 40 and 41.

The output of the NOR gate 46 and the signals fed to the ports A and B are fed to the NOR gate 47. The output terminal of the NOR gate 46 is connected through the capacitor C2 to the junction between the diodes 41 and 42. The output of the NOR gate 47 and the signals fed to the ports A, B, and C are fed to the NOR gate 48. The output terminal of the NOR gate 47 is connected through the capacitor C3 to the junction between the diodes 42 and 43.

The output terminal of the NOR gate 48 is connected through the capacitor C4 to the junction between the diodes 43 and 44. Between the cathode of the diode 44 and the ground level, the voltage step-up capacitor C5 is connected. The inverter 45 and the NOR gates 46 to 48 operate on the voltage Vin.

Just as in the first embodiment described previously, the voltage step-up circuit here operates in the same manner as the voltage step-up circuit 2 shown in FIG. 2 to produce a stepped-up voltage by activating an appropriate number of the capacitors C1 to C5 in accordance with the signals fed to the ports A, B, and C. Note that the diodes 40 to 44 may be, as shown in FIG. 6, replaced with diode-connected p-channel MOSFETs (i.e. with their source connected to their gate), or with n-channel MOS transistors with their drain connected to their gate.

As described above, this second embodiment operates in the same manner as the first embodiment described previously. Note however that, although the inverter 45 and the NOR gates 46 to 48 operate on the voltage Vin, the diodes 40 to 44 cause voltage drops, and therefore the voltage is not stepped up exactly by an integral factor. Note also that the voltage step-up factor is affected by the voltage on which the inverter 45 and the NOR gates 46 to 48 operate.

<Third Embodiment>

Figure 7:
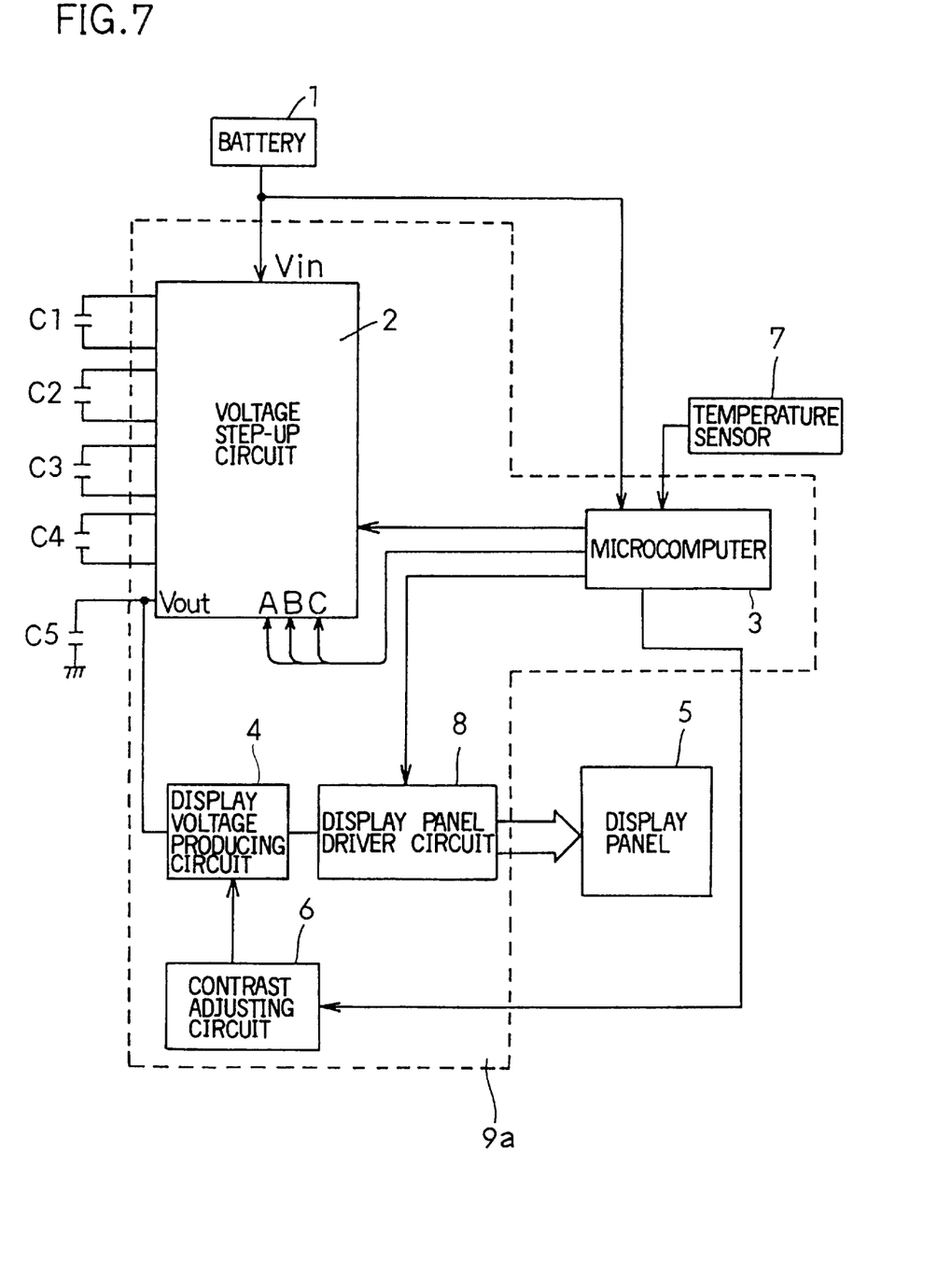
FIG. 7 is a block diagram of the display panel driver of a third embodiment of the invention.

FIG. 7 is a block diagram of the display panel driver of a third embodiment of the present invention. This display panel driver, for driving a display panel 5, is formed as a driver IC 9a. Here, the driver IC 9a incorporates, in addition to the circuits 2, 4, 6, and 8 that are incorporated in the driver IC 9 (see FIG. 1), also a microcomputer 3. In other respects, this embodiment is quite the same as the previous embodiments, and therefore, in FIG. 7, such components as are found also in FIG. 1 are identified with the same reference numerals and symbols, and overlapping explanations will not be repeated. This third embodiment operates in the same manner as the first and second embodiments described previously, and thus helps reduce the current consumption and eliminate the need to switch between output ports.

What is claimed is:

1. A display panel driver comprising:

a battery;

control means for monitoring a power source voltage supplied from the battery and outputting a control signal in accordance with the power source voltage;

a voltage step-up circuit for stepping up the power source voltage supplied from the battery by a voltage step-up factor specified by the control signal; and a display panel driver circuit for producing signals for driving a display panel from a voltage outputted from the voltage step-up circuit, wherein the control means increases the voltage step-up factor when the source voltage drops and decreased the voltage step-up factor when the source voltage rises.

2. A display panel driver as claimed in claim 1, wherein the voltage step-up circuit comprises:
an input terminal for receiving the power source voltage;
an output terminal for outputting a stepped-up voltage;
a plurality of switching devices connected in series between the input terminal and the output terminal;
a plurality of capacitors each connected, at one end, to an output electrode of one of the switching devices;
first means, connected to the other end of each of the capacitors, for setting the other end of two adjacent ones of the capacitors at two different binary levels in accordance with the control signal; and
second means for turning on and off the switching devices in accordance with the control signal.

3. A display panel driver as claimed in claim 2, wherein the factor by which the power source voltage is stepped up is varied by varying how many of the capacitors are activated by the first and second means in accordance with the control signal.

4. A display panel driver as claimed in claim 1, further comprising:
a display voltage producing circuit for producing a display voltage in accordance with the voltage outputted from the voltage step-up circuit,
wherein the display panel driver circuit produces the signals for driving the display panel in accordance with the display voltage.

5. A display panel driver as claimed in claim 4, wherein the display voltage producing circuit comprises:
voltage-dividing means for dividing the voltage from the voltage step-up circuit into a plurality of voltages; and
adjusting means for adjusting the voltage outputted from the display voltage producing circuit in accordance with an adjustment signal.

6. A display panel driver as claimed in claim 5, wherein the voltage-dividing means comprises:
a first resistor circuit composed of a plurality of serially connected resistors and fed with a stepped-up voltage at one end; and
a plurality of output lines each connected to one of junctions between the resistors, and
wherein the adjusting means comprises:
a plurality of resistors connected between the other end of the first resistor circuit and ground; and
a plurality of switches each connected in parallel with one of the plurality of resistors of the adjusting means and turned on and off in accordance with the adjustment signal.

7. A display panel driver as claimed in claim 5, wherein the control means outputs another control signal in accordance with ambient temperature.

8. A display panel driver comprising:
control means for monitoring a power source voltage and outputting a control signal in accordance with the power source voltage;
a voltage step-up circuit for stepping up the power source voltage by a voltage step-up factor specified by the control signal; and
a display panel driver circuit for producing signals for driving a display panel from a voltage outputted from the voltage step-up circuit,
wherein the control means increases the voltage step-up factor when the source voltage drops and decreases the voltage step-up factor when the source voltage rises.

9. A display panel driver as claimed in claim 8, wherein the display panel driver is formed as an integrated circuit.

10. A display panel drier as claimed in claim 8, wherein the control means also receives information on ambient temperature to output another control signal in accordance with the information on ambient temperature.

11. A display panel driver as claimed in claim 10, wherein the display panel driver is formed as an integrated circuit.

\* \* \* \* \*